United States Patent
Ghaly et al.

(10) Patent No.: US 10,482,663 B2
(45) Date of Patent: Nov. 19, 2019

(54) VIRTUAL CUES FOR AUGMENTED-REALITY POSE ALIGNMENT

(71) Applicant: Microsoft Technology Licensing, LLC, Redmond, WA (US)

(72) Inventors: Marcus Ghaly, Kirkland, WA (US); Andrew Jackson, Kirkland, WA (US); Jeff Smith, Duvall, WA (US); Michael Scavezze, Bellevue, WA (US); Ronald Amador-Leon, Duvall, WA (US); Cameron Brown, Redmond, WA (US); Charlene Jeune, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/336,392

(22) Filed: Oct. 27, 2016

(65) Prior Publication Data

US 2017/0287221 A1     Oct. 5, 2017

Related U.S. Application Data

(60) Provisional application No. 62/314,865, filed on Mar. 29, 2016.

(51) Int. Cl.
*G06T 19/00* (2011.01)
*H04N 13/128* (2018.01)
(Continued)

(52) U.S. Cl.
CPC ........ *G06T 19/006* (2013.01); *G02B 27/0172* (2013.01); *G06T 7/30* (2017.01); (Continued)

(58) Field of Classification Search
CPC ..... G06T 19/006; G06T 7/0024; G06T 7/004; G06T 2200/04; G06T 2207/30244; G02B 27/0172; G02B 2027/0138; G02B 2027/0141; G02B 2027/0178; H04N 13/0022; H04N 13/0203; H04N 2013/0081; G06F 3/167
See application file for complete search history.

(56) References Cited

U.S. PATENT DOCUMENTS

| 5,029,997 A | 7/1991 | Faroudja |
| 6,154,723 A | 11/2000 | Cox et al. |

(Continued)

OTHER PUBLICATIONS

Sakar Babu, "How to Create a Rollover Image Effect—HTML (Change image on mouseover)", YouTube video published on Feb. 6, 2014. 0:00-1:15. (Year: 2014) https://www.youtube.com/watch?v=qtpa_r1Ljo.*

(Continued)

*Primary Examiner* — Chong Wu
(74) *Attorney, Agent, or Firm* — Alleman Hall Creasman & Tuttle LLP

(57) ABSTRACT

A method includes determining a current pose of an augmented reality device in a physical space, and visually presenting, via a display of the augmented reality device, an augmented-reality view of the physical space including a predetermined pose cue indicating a predetermined pose in the physical space and a current pose cue indicating the current pose in the physical space.

20 Claims, 11 Drawing Sheets

(51) Int. Cl.
| | |
|---|---|
| H04N 13/204 | (2018.01) |
| G02B 27/01 | (2006.01) |
| H04N 5/232 | (2006.01) |
| G06T 7/30 | (2017.01) |
| G06T 7/70 | (2017.01) |
| G06F 3/16 | (2006.01) |
| H04N 13/00 | (2018.01) |

(52) U.S. Cl.
CPC ........... *G06T 7/70* (2017.01); *H04N 5/23222* (2013.01); *H04N 5/23293* (2013.01); *H04N 13/128* (2018.05); *H04N 13/204* (2018.05); *G02B 2027/0138* (2013.01); *G02B 2027/0141* (2013.01); *G02B 2027/0178* (2013.01); *G06F 3/167* (2013.01); *G06T 2200/04* (2013.01); *G06T 2207/30244* (2013.01); *H04N 2013/0081* (2013.01)

(56) References Cited

U.S. PATENT DOCUMENTS

| | | | |
|---|---|---|---|
| 7,889,197 | B2 | 2/2011 | Kraver |
| 8,217,995 | B2 | 7/2012 | Dobbins et al. |
| 2007/0109398 | A1 | 5/2007 | Teo |
| 2011/0102424 | A1 | 5/2011 | Hibbert et al. |
| 2012/0022546 | A1 | 1/2012 | Hubschman et al. |
| 2014/0009579 | A1 | 1/2014 | Sumi et al. |
| 2014/0267868 | A1 | 9/2014 | Mazzola et al. |
| 2014/0368620 | A1 | 12/2014 | Li et al. |
| 2016/0005229 | A1* | 1/2016 | Lee .................. G06F 3/0488 345/419 |
| 2016/0174918 | A1* | 6/2016 | Wang .................. A61B 6/4405 378/63 |

OTHER PUBLICATIONS

Yeyeyerman, "Is it possible to hide the cursor in a webpage using CSS or Javascript?", published at Stack Overflow, on Jul. 1, 2009. p. 1. (Year: 2009) https://stackoverflow.com/questions/1071356/is-it-possible-to-hide-the-cursor-in-a-webpage-using-css-or-javascript.*

ISA European Patent Office, International Search Report and Written Opinion Issued in PCT Application No. PCT/US2017/023926, dated Jun. 7, 2017, WIPO, 11 pages.

Smith, Will., "How to turn your iPhone Into a Stop Motion Camera", Published on: Apr. 2, 2012 Available at: http://www.tested.com/tech/photography/43723-how-to-turn-your-iphone-into-a-stop-motion-camera/.

"Frames is perfect for claymation and stop motion animation", Published on: Jan. 1, 2015 Available at: http://www.tech4learning.com/frames/clay.

"StopMojo Version 0.2", Published on: Apr. 15, 2005 Available at: http://www.mondobeyondo.com/projects/stopmojo/.

"Dragonframe", Published on: Aug. 24, 2013 Available at: http://www.dragonframe.com/features.php.

"OSnap", Published on: Feb. 6, 2015 Available at: http://www.osnapphotoapp.com/features.php.

"Premiere Elements / Capture stop-motion and time-lapse video", Published on: Jul. 18, 2013 Available at: http://help.adobe.com/fr_FR/premiereelements/using/WS07E90062-585C-4060-8827-08FCCD4AFA6D.html.

Reeve, et al., "Basic Principles of Stereoscopic 3D", Published on: Feb. 9, 2015 Available at: http://www.sky.com/shop/_PDF/3D/Basic_Principles_of_Stereoscopic_3D_v1.pdf.

* cited by examiner

VIRTUAL CUES FOR AUGMENTED-REALITY POSE ALIGNMENT

CROSS REFERENCE TO RELATED APPLICATIONS

This application claims priority to U.S. Provisional Patent Application No. 62/314,865, filed Mar. 29, 2016, the entirety of which is hereby incorporated herein by reference.

BACKGROUND

An augmented-reality device may be configured to display augmented-reality images to provide the illusion that virtual objects, sometimes referred to as holograms, are present in a real-world physical space. Further, the augmented-reality device may be configured to capture an augmented-reality image for later playback. The captured augmented-reality image may have a particular pose (e.g., 6 degrees of freedom (DOF): x, y, z, yaw, pitch, roll) representative of the camera position at the time of image capture.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method includes determining a current pose of an augmented reality device in a physical space, and visually presenting, via a display of the augmented reality device, an augmented-reality view of the physical space including a predetermined pose cue indicating a predetermined pose in the physical space and a current pose cue indicating the current pose in the physical space.

DETAILED DESCRIPTION

In some scenarios, a user may desire to capture an augmented-reality image while a camera has a particular predetermined pose (e.g., in 6 degrees of freedom). For example, a user may attempt to create an augmented-reality video by capturing a sequence of augmented-reality images. However, without proper pose alignment for each captured augmented-reality image in the sequence, the augmented-reality video may appear to "jump around" or otherwise be distorted as the camera pose changes from one captured image to the next. In general, a user may desire to capture an image from any predetermined pose for any reason.

Accordingly, the present description is directed to various approaches for helping align a current pose of an augmented-reality device with a predetermined pose. More particularly, the present description is directed to presenting pose information in the form of virtual cues that indicate a predetermined pose in the real-world physical space and a current pose of the augmented-reality device. The virtual cues may provide feedback to the user that may allow the user to align the current pose of the augmented-reality device with the predetermined pose. In some scenarios, the virtual cues may include visual cues. In some scenarios, the virtual cues may include audio cues. In some implementations, a state of the virtual cues may change to indicate that the current pose is properly aligned with the predetermined pose.

Figure 1:
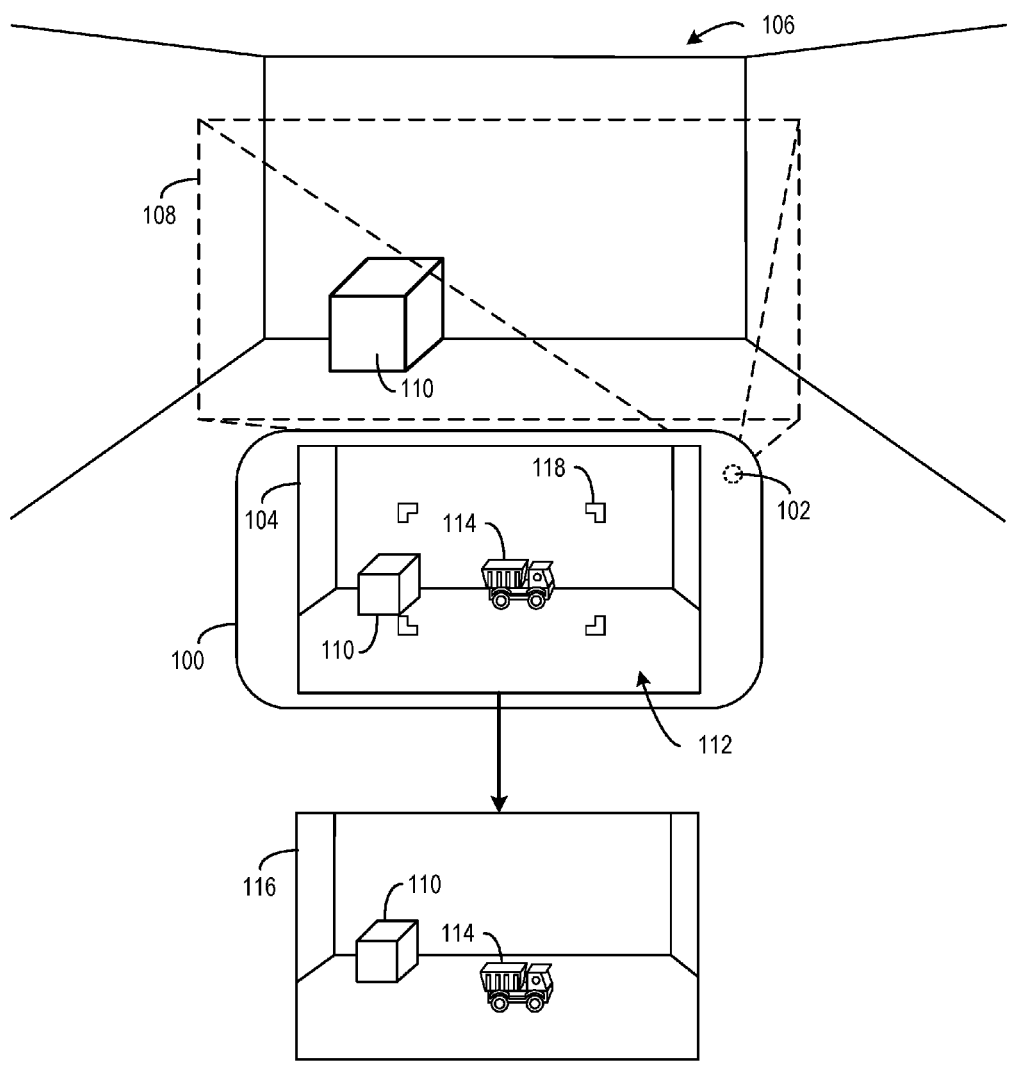
FIG. 1 shows an augmented-reality device visually presenting virtual cues in an augmented-reality view that aid in pose alignment of the augmented-reality device.

FIG. 1 shows a non-limiting example of an augmented-reality device in the form of a mobile computing device 100 including an outward-facing point-of-view camera 102 and a display 104. The point-of-view camera 102 images the physical space 106 within a field of view 108, and the display 104 visually presents the image captured by the point-of-view camera 102. The physical space 106 may include real-world objects, such as a cube 110. The real-world cube 110 is visible without the use of an augmented-reality device, such as the mobile computing device 100.

The mobile computing device 100 may be configured to visually present an augmented-reality view 112 of the physical space 106 via the display 104. The augmented-reality view 112 may include one or more virtual objects overlaid on the image of the physical space 106. In the illustrated example, the virtual object includes a virtual truck 114 and a current pose cue 118. The current pose cue 118 indicates a current pose of the mobile computing device 100 in the physical space 106. The current pose cue 118 has a device-locked position that changes with the current pose of the mobile computing device 100. Note that the virtual objects 114 and 118 can only be seen via the display 104.

The mobile computing device 100 may be configured to capture an augmented-reality image 116 of the physical space 106. The augmented-reality image 116 may include a combination of real-world objects, such as the cube 110, and virtual objects, such as the virtual truck 114 and the current pose cue 118. The augmented-reality image is analogous to a conventional digital photograph in that it records the view of a camera at a particular moment in time and allows a user to review that recorded view at any subsequent time. However, unlike a conventional photograph that only includes the real-world objects imaged by the camera at the time of capture, the augmented-reality image also records the virtual objects that were admixed with the real-world objects at the time of capture. The augmented-reality image may be saved in any suitable format for subsequent playback on mobile computing device 100 and/or another computing device. For example, the augmented-reality image may be sent via a computer network to a cloud storage location.

The current pose cue 118 may aid a user in aligning a pose of the mobile computing device 100 and/or the camera 102 with a predetermined pose in order to view the physical space 106 from the perspective of the predetermined pose and/or capture the augmented-reality image 116 from the perspective of the predetermined pose. The mobile computing device 100 may omit the current pose cue 118 from the augmented-reality image 116 such that the current pose cue 118 does not appear in the augmented-reality image 116 during playback.

Figure 10:
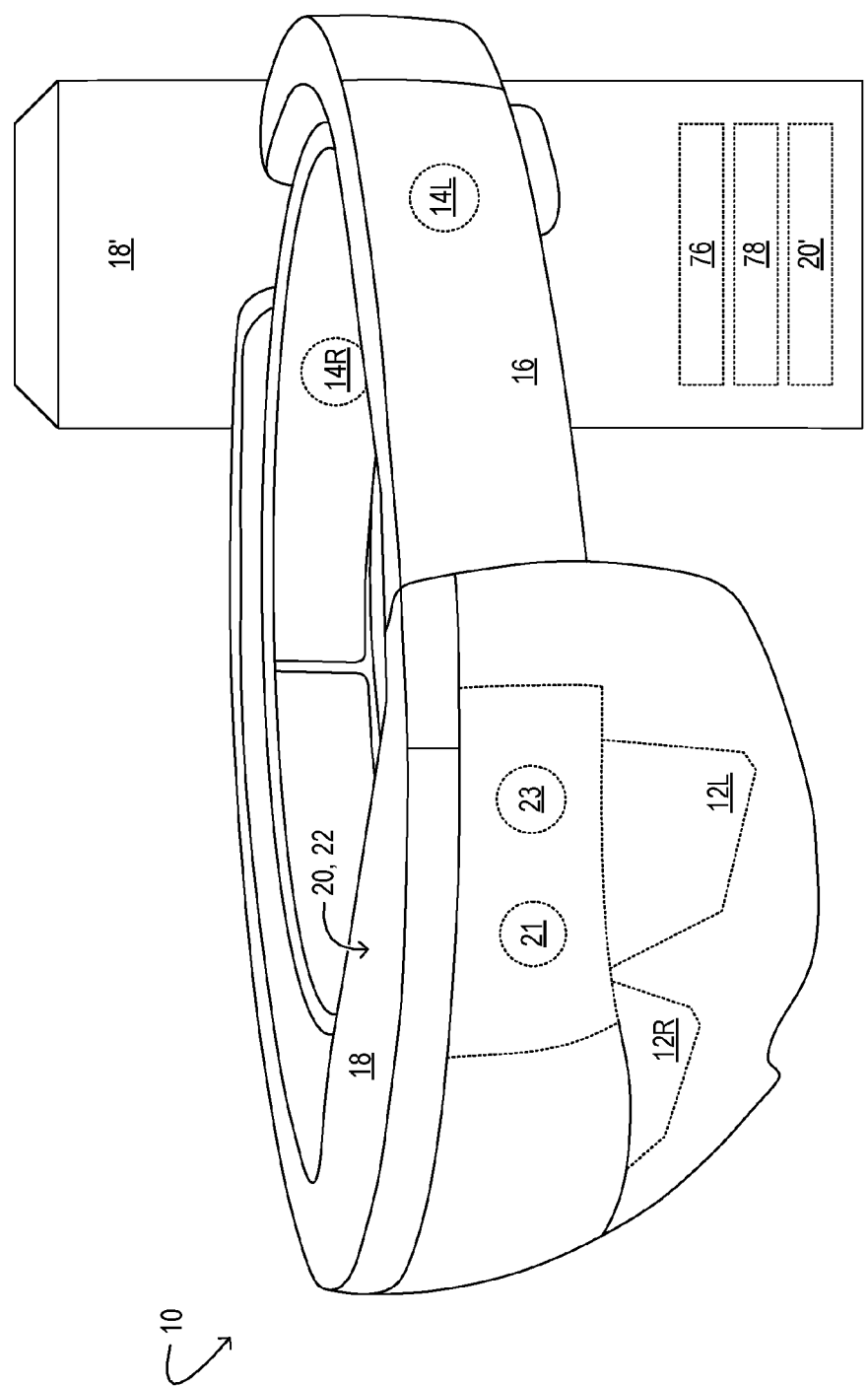
FIG. 10 shows aspects of a wearable near-eye display system and off-board computer configured to present virtual cues.

FIGS. 2 and 5-8 show different augmented-reality views that may be visually presented by an augmented-reality device, such as the mobile computing device 100 of FIG. 1 or a wearable stereoscopic display system 10 of FIG. 10. The different augmented-reality views include virtual cues to aid a user in aligning a current pose of the augmented-reality device with a predetermined pose.

Figure 2:
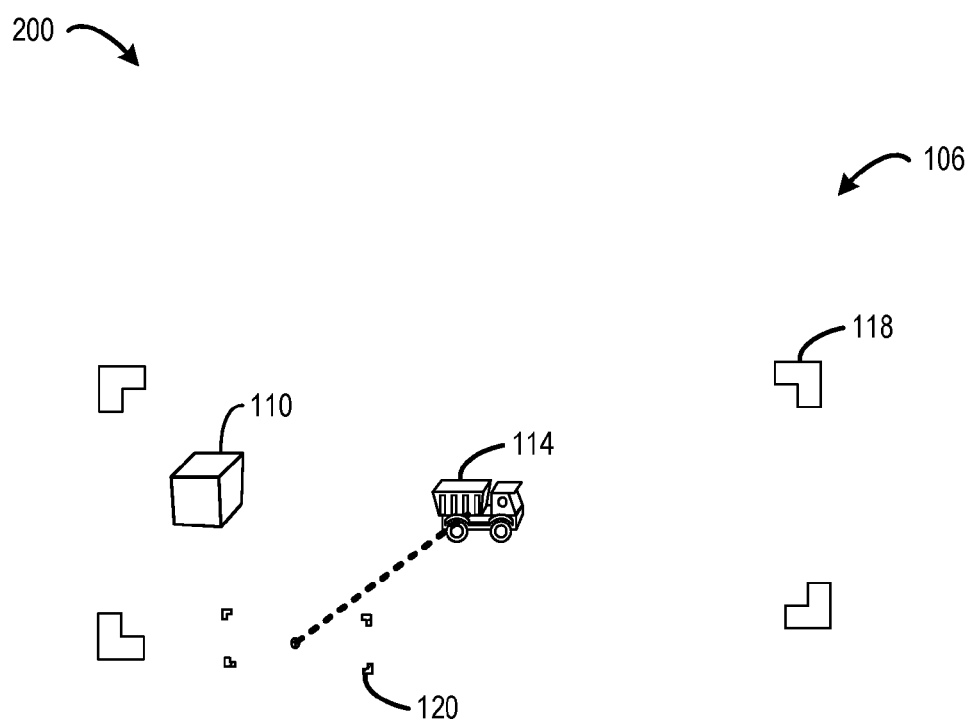
FIG. 2 shows an augmented-reality view visually presented by an augmented-reality device including a predetermined pose cue and a current pose cue.

FIG. 2 shows an augmented-reality view 200 of the real-world physical space 106 that may be visually presented by the display 104 of the mobile computing device 100 of FIG. 1. The augmented-reality view 200 has a perspective of a current pose of the mobile computing device 100 at a time T0. The augmented-reality view 200 includes a real-world cube 110, a virtual truck 114, a current pose cue 118, and a predetermined pose cue 120. The current pose cue 118 includes a set of four virtual coplanar markers useable to aim the camera of the augmented-reality device. The four virtual coplanar markers of the current pose cue 118 at least partially indicate a field of view of the current pose.

The current pose cue 118 has a device-locked position that changes with a perspective of the camera as the current pose of the augmented-reality device changes in the physical space 106. As such, current pose cue 118 appears to occupy the same portion of a display and appears to be at the same distance in front of the camera, even as the camera moves in the physical space 106.

The predetermined pose cue 120 includes four virtual coplanar markers that at least partially indicate a field of view from the predetermined pose. The predetermined pose cue 120 has a world-locked position that is fixed relative to the physical space 106, even as the current pose of the mobile computing device 100 changes. Further, the predetermined pose cue 120 includes a line-of-sight indicator in the form of a dotted line that extends from a targeting reticle centered in the field of view of the predetermined pose to a viewing target of the predetermined pose (e.g., the virtual truck 114).

The predetermined pose that is indicated by the predetermined pose cue 120 may assume any suitable pose in the physical space 106. Moreover, the predetermined pose may be received or determined by the mobile computing device 100 in any suitable manner. In some cases, the predetermined pose may be determined during capture of a previously-captured image of the physical space 106. In one example, the predetermined pose is determined by a pose sensing system of the mobile computing device 100 during capture of the previously-captured image by the camera 102. In another example, the predetermined pose is determined by another camera or augmented-reality device. In either case, the predetermined pose may be stored in memory (e.g., the predetermined pose may be stored as metadata associated with a previously captured image). In another example, the predetermined pose may be provided by another source, such as an application executed by the mobile computing device 100. In one example, a map application may include waypoints from which various landmarks may be viewed, and the map application may provide predetermined poses from which to view and/or capture the landmarks.

Furthermore, when the mobile computing device 100 is visually presenting the augmented-reality view 200, the mobile computing device 100 may receive the predetermined pose from a remote source (e.g., another augmented-reality device, cloud storage) or may retrieve the predetermined pose from memory. In this way, the mobile computing device 100 may appropriately position the predetermined pose cue 120 at the predetermined pose in the augmented-reality view 200 (e.g., via use of a shared coordinate system).

The different virtual cues 118, 120 may have different appearances in order to differentiate the different virtual cues from each other. For example, the different virtual cues may have different patterns. In the illustrated example, the current pose cue 118 is solid white and the predetermine pose cue 120 has diagonal stripes. In another example, the different virtual cues may be color-coded. In one example, the current pose cue is blue, the predetermined pose cue is yellow, and a visual alignment cue that indicates that the current pose cue is at least partially aligned with the predetermined pose cue is green. The virtual cues may be visually differentiated from each other in any suitable manner.

Any suitable type of virtual cue may be presented by an augmented-reality device. In some implementations, the virtual cues may include separate rotation and direction visual alignment indicators. In some implementations, the virtual cues may include alignment of a continuous field of view frame with a world-locked continuous frame. In some implementations, the virtual cues may include alignment of a set of device-locked markers with a set of world-locked markers on a plane. In some implementations, the virtual cues may include a world-locked "ghost" image (e.g., at least partially translucent) of a previously-captured image positioned at a predetermined pose at which the previously-captured image was captured. In some implementations, the virtual cues may include a ghost scene of previous hologram poses. In some implementations, the virtual cues may include 3D/2D alignment of different axes. In some implementations, various characteristics of the virtual cues may change as a current pose moves closer to a predetermined pose. For example, a brightness, transparency, color, or sound of a virtual cue may change as the current pose moves closer to the predetermined pose.

Figure 3:
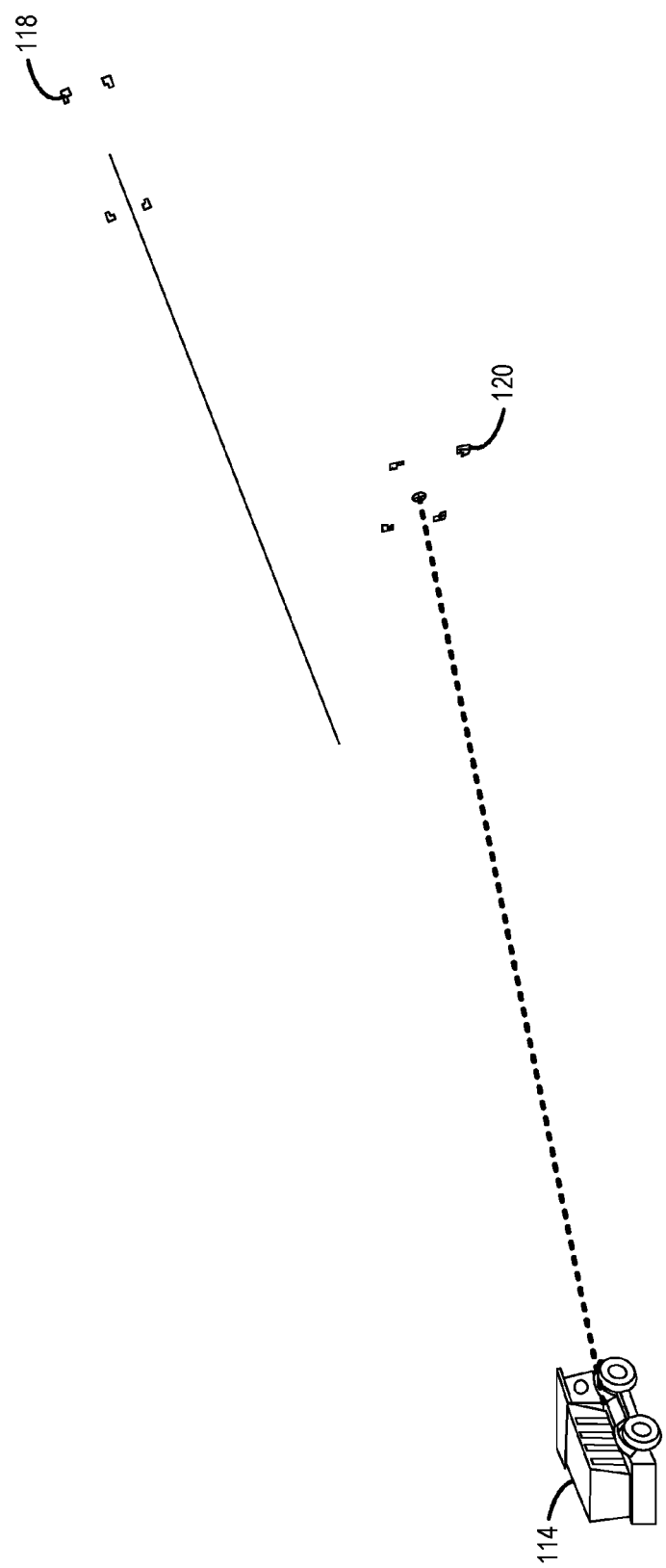
FIGS. 3-4 schematically show relative positions of the predetermined pose cue and the current pose cue of FIG. 2.
Figure 4:
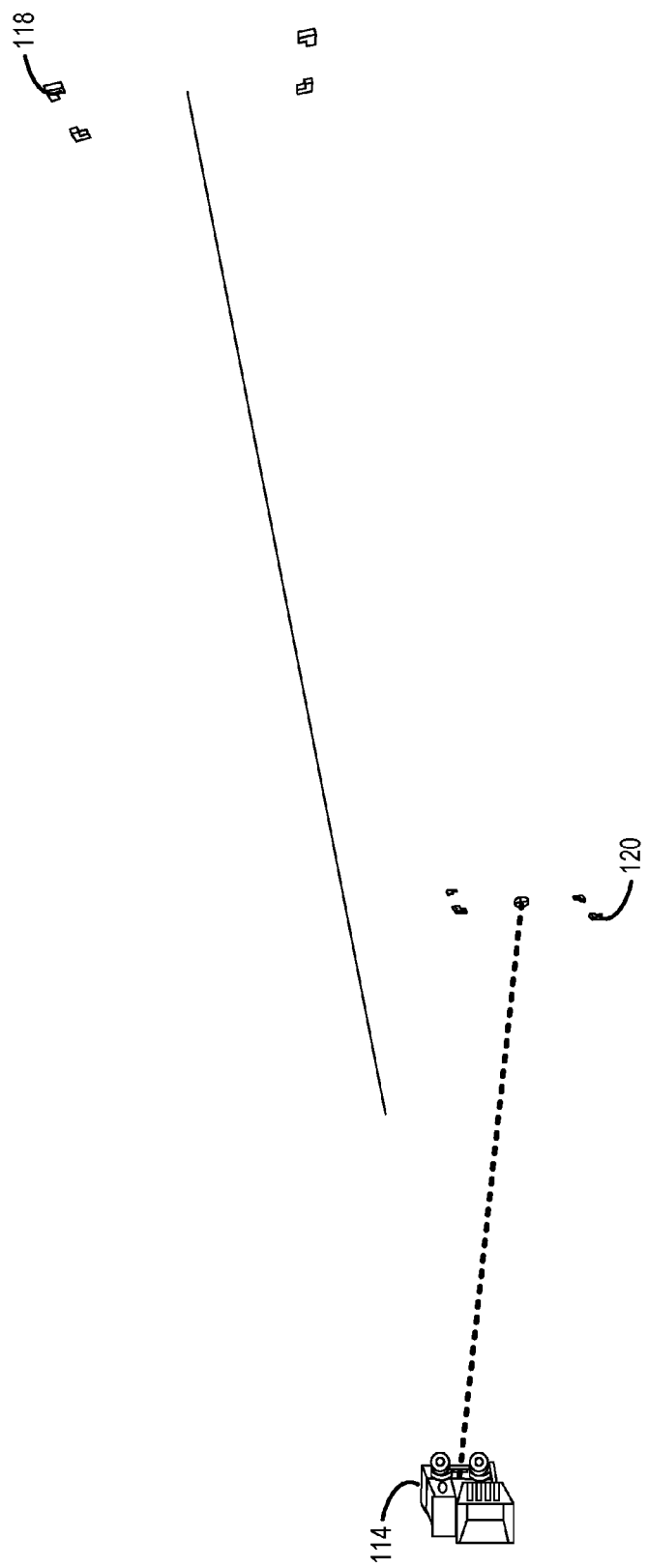

FIGS. 3-4 schematically show relative positions of the virtual truck 114, the current pose cue 118, and the predetermined pose cue 120 at time T0. In particular, FIG. 3 shows a side perspective of the relative positions, and FIG. 4 shows an overhead perspective of the relative positions.

Figure 5:
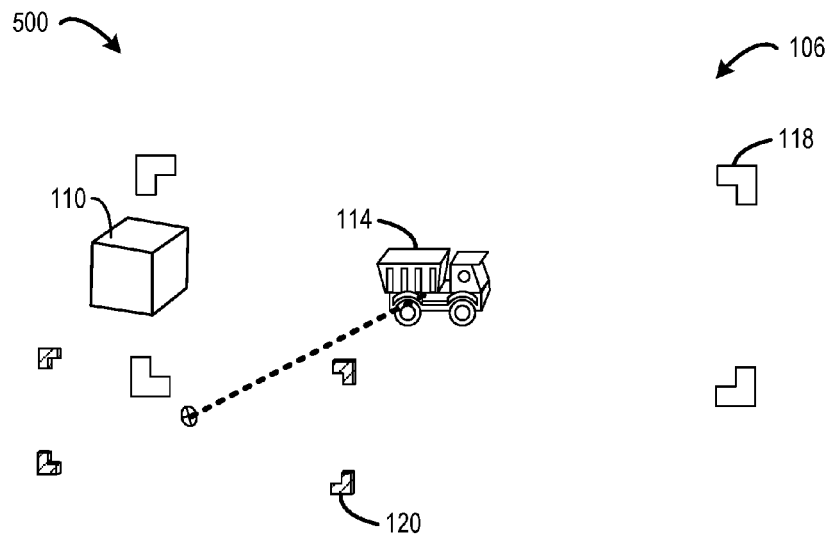
FIGS. 5-7 show the current pose cue moving closer to the predetermined pose cue over time.

FIGS. 5-8 show the current pose cue 118 continuing to move closer to the predetermined pose cue 120 over time as the current pose moves closer to the predetermined pose in the physical space 106. FIG. 5 shows an augmented-reality view 500 of the real-world physical space 106 from a pose of the mobile computing device 100 at a time T1 subsequent to time T0. In FIG. 5, the current pose of the mobile computing device 100 has moved closer to the predetermined pose in the physical space 106 relative to the pose of the mobile computing device 100 at time T0. Accordingly, the current pose cue 118 appears closer to the predetermined pose cue 120, as well as closer to the virtual truck 114 in the augmented-reality view 500 relative to the augmented-reality view 200. Because the predetermined pose cue 120 has a world-locked position, the predetermined pose cue 120 has not changed positions relative to the physical space 106.

Figure 6:
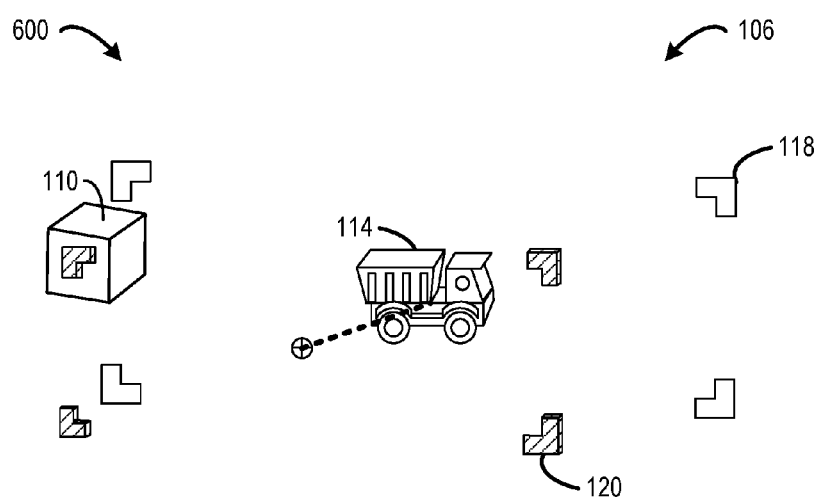

FIG. 6 shows an augmented-reality view 600 of the real-world physical space 106 from a pose of the mobile computing device 100 at a time T2 subsequent to time T1. In FIG. 6, the current pose of the mobile computing device 100 has moved closer to the predetermined pose in the physical space 106 relative to the pose of the mobile computing device 100 at time T1. Accordingly, the current pose cue 118 appears closer to the predetermined pose cue 120, as well as closer to the virtual truck 114 in the augmented-reality view 600 relative to the augmented-reality view 500.

Figure 7:
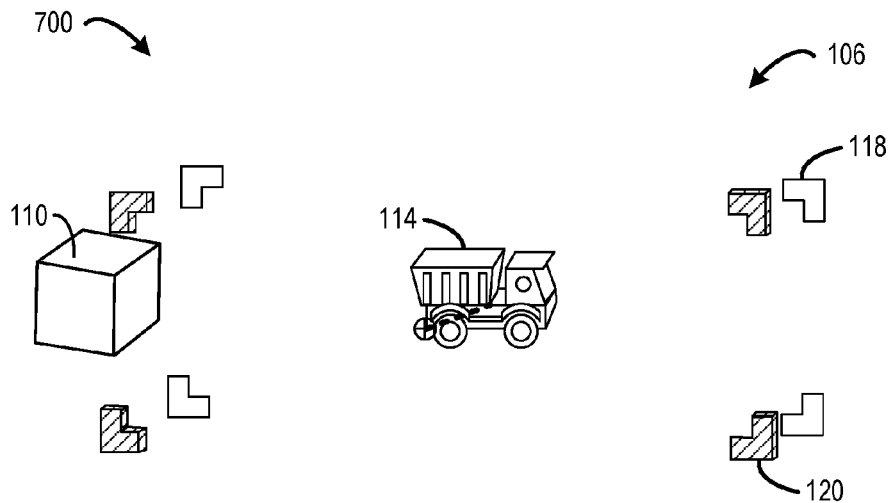

FIG. 7 shows an augmented-reality view 700 of the real-world physical space 106 from a pose of the mobile computing device 100 at a time T3 subsequent to time T2. In FIG. 7, the current pose of the mobile computing device 100 has moved closer to the predetermined pose in the physical space 106 relative to the pose of the mobile computing device 100 at time T2. Accordingly, the current pose cue 118 appears closer to the predetermined pose cue 120, as well as closer to the virtual truck 114 in the augmented-reality view 700 relative to the augmented-reality view 600.

Figure 8:
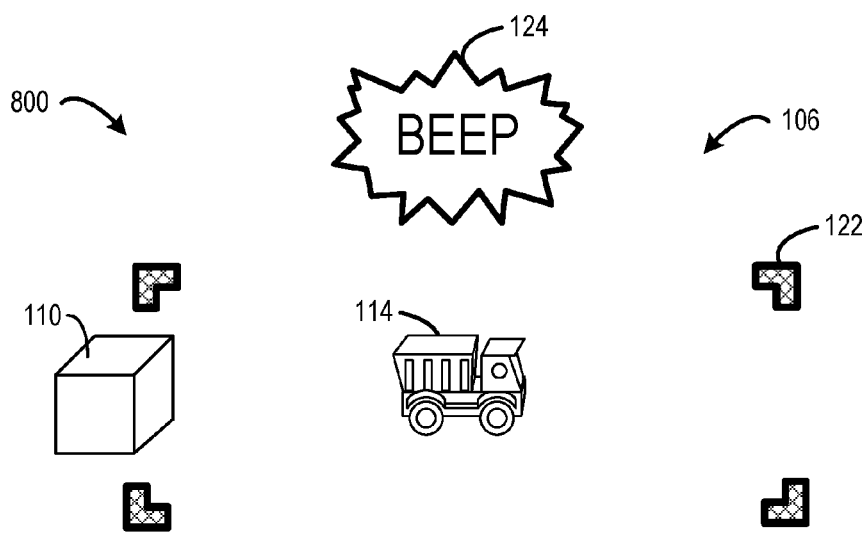
FIG. 8 shows a visual alignment cue indicating that the current pose is at least partially aligned with the predetermined pose.

FIG. 8 shows an augmented-reality view 800 of the real-world physical space 106 from a pose of the mobile computing device 100 at a time T4 subsequent to time T3. In FIG. 8, the current pose of the mobile computing device 100 has moved into alignment with the predetermined pose. As such, the current pose cue and the predetermined pose cue have merged and have been replaced by a visual alignment cue 122. The mobile computing device 100 visually presents the visual alignment cue 120 in the augmented-reality view 800 to visually indicate that the current pose of the mobile computing device 100 is at least partially aligned with the predetermined pose.

The visual alignment cue 122 may indicate any suitable form of alignment between the current pose and the predetermined pose. For example, the current pose and the predetermined pose may be aligned if the two poses are within a rotational threshold and/or a translational threshold of each other.

The visual alignment cue 122 may take any suitable form. The visual alignment cue 122 may have a shape, pattern, color, or other visual characteristic that differs relative to predetermined pose cue and the current pose cue. Other visible aspects of the display may additionally or alternatively change to indicate alignment. As one example, an entirety of the display may be given a green tint when alignment is achieved.

In some implementations where the augmented-reality device includes an audio speaker, the augmented-reality device may be configured to audibly present, via the audio speaker, an audio alignment cue indicating that the current pose cue is at least partially aligned with the predetermined pose cue in the augmented-reality view. The audio alignment cue may be audibly presented in response to the current pose aligning with the predetermined pose. The audio alignment cue may be audibly presented for any suitable duration. For example, in FIG. 8, an audio alignment cue 124 in the form of a "BEEP" sound effect is audibly presented to indicate alignment of the current pose with the predetermined pose. In other examples, the audio cue may include a ring, a buzz, a click, or another sound. In some implementations, the mobile computing device 100 may present audio alignment cues without presenting any visual alignment cues. For example, the mobile computing device 100 may present a tone or a buzz that increases in volume as the current pose moves closer to the predetermined pose. In another example, the mobile computing device 100 may present a periodic beep, and a duration between beeps may decrease as the current pose moves closer to the predetermined pose.

When alignment of the predetermine pose cue and the current pose cue is achieved, an image can be captured by the camera 102 from the perspective of the predetermined pose, for example. Note that the captured image may be an augmented-reality image including one or more virtual object (e.g., virtual truck 114) overlaid on the physical space 106 or the captured image may not include any virtual objects or otherwise virtual augmentation. In some implementations, the image may be automatically captured responsive to alignment being achieved.

Furthermore, the captured image may be incorporated into a sequence of captured images that may be assembled as an animation. The mobile computing device 100 may be configured to assemble any suitable type of animation from images captured using the virtual cues. In one example, the mobile computing device 1000 may capture a sequence of different images at different times while the current pose cue is aligned with the predetermined pose cue. In other words, the virtual cues may be used to return the mobile computing device 100 to the same position in the physical space 106 at different times (e.g., hours, days, weeks, years) to capture images of the physical space 106 from the same perspective over time. Further, the mobile computing device 100 may be configured to visually present a time-lapse animation including the sequence of images of the physical space 106 captured from the perspective of the predetermined pose at different times.

In another example, the mobile computing device 100 may capture an image while the current pose cue is aligned with a first predetermined pose cue. Upon the image being captured, the mobile computing device 100 may visually present a next predetermined pose cue having a pose in the physical space that is different than a pose of the first predetermined pose cue. Once the current pose of the mobile computing device 100 is aligned with next predetermined pose cue, the mobile computing device 100 may capture another image. These steps may be repeated to capture a sequence of images from a plurality of different predetermined poses in the physical space 106. Further the mobile computing device 100 may be configured to visually present a stop-motion animation including the sequence of images of the physical space captured from the perspective of the plurality of different predetermined poses. In such a scenario, the sequence of predetermined poses may include any suitable number of different predetermined poses. In some such scenarios, the sequence may be automatically generated based on an initial predetermined pose in the sequence. For example, in a 360° animation, a first predetermined pose may be determined and each subsequent predetermined pose in the sequence may be radially offset from the previous predetermined pose in the sequence.

The virtual cues may be presented by the mobile computing device 100 during any suitable operating mode and/or under any suitable conditions. For example, the virtual cues may be presented during image and/or animation capture modes, such as the examples described above. Such operating modes may be initiated in any suitable manner. In one example, to initialize the stop-motion animation capture mode, a user can either say "Stop Motion" or use a gesture to display a stop-motion capture dialog. This dialog may show a preview of the previously captured images as well as expose functions on those images. Further, to capture additional images, the user can say "Capture" or air tap a virtual capture button visually presented on the dialog. The virtual cues may be visually presented to aid the user in aligning the mobile computing device 100 to capture the image from the desired perspective. The user may air tap or provide other user input to capture the image. Further, the dialog may enable various captured images to be reordered or removed, clear all images from a sequence, cycle through individual images in a sequence, set a frame rate of a sequence, and view, store, share, and/or export the sequence of images as an animation, formatted as a GIF, for example.

Figure 9:
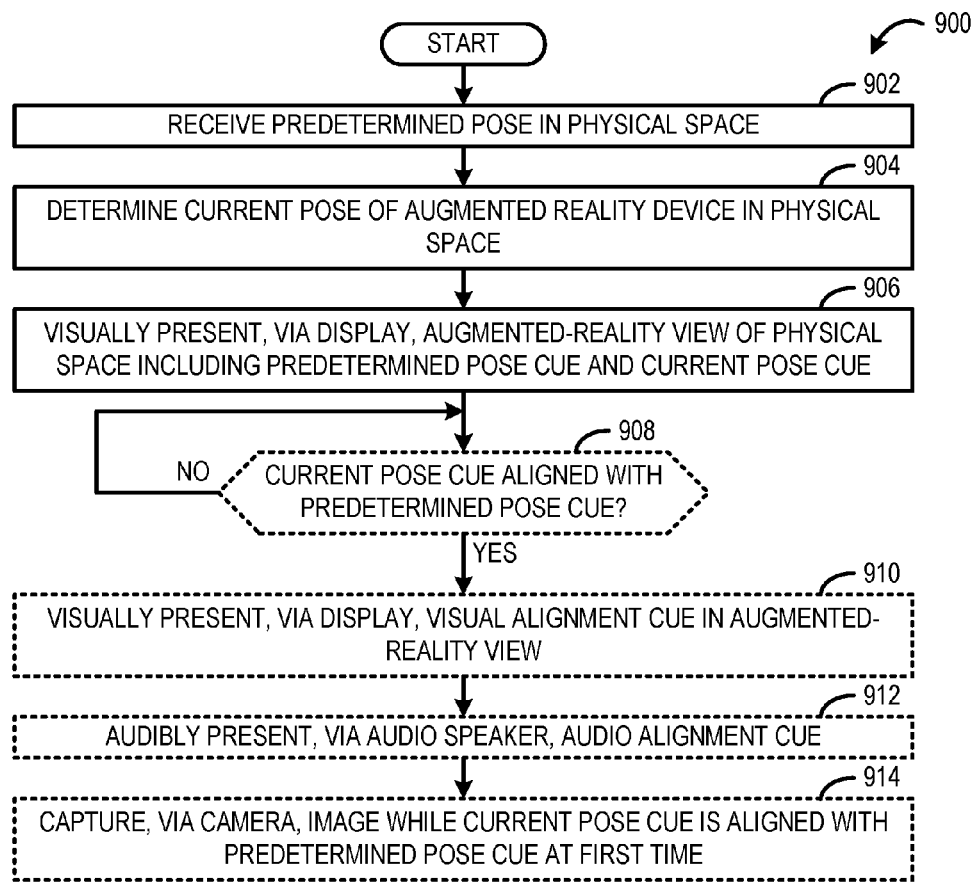
FIG. 9 shows a method of visually presenting an augmented-reality view of a physical space with virtual cues.

FIG. 9 shows a method 900 of visually presenting an augmented-reality view of a physical space with virtual cues. For example, the method 900 may be performed by the mobile computing device 100 of FIG. 1, the wearable stereoscopic display system 10 of FIG. 10, or by any other suitable augmented-reality device. At 902, the method 900 includes receiving a predetermined pose in a physical space. In one example, the predetermined pose is determined, via a pose sensing system of an augmented-reality device, during capture of a previously-captured image of the physical space via a camera of the augmented-reality device. At 904, the method 900 includes determining a current pose of the augmented-reality device in the physical space. For example, the current pose may be determined by the pose sensing system of the augmented reality device. At 906, the method 900 includes visually presenting, via a display of the augmented reality device, an augmented-reality view of the physical space including a predetermined pose cue indicating the predetermined pose in the physical space and a current pose cue indicating the current pose in the physical space. The predetermined pose cue may have a world-locked position that is fixed relative to the physical space, and the current pose cue may have a device-locked position that changes with the current pose of the augmented-reality device. The virtual cues may be visually presented as aids to align the augmented-reality device with the predetermined pose such that the augmented-reality device can visually present a view (e.g., an augmented-reality view or a non-augmented-reality view) of the physical space from the perspective of the predetermined pose.

In some implementations, at 908, the method 900 optionally may include determining whether the current pose cue is aligned with the predetermined pose cue. If the current pose cue is aligned with the predetermined pose cue, then the method 900 moves to 910. Otherwise the method 900 returns to 908. At 910, the method 900 optionally may include visually presenting, via the display, a visual alignment cue indicating that the current pose cue is at least partially aligned with the predetermined pose cue in the augmented-reality view. In some implementations where the augmented-reality device includes an audio speaker, at 912, the method optionally may include audibly presenting, via the audio speaker, an audio alignment cue indicating that the current pose cue is at least partially aligned with the predetermined pose cue in the augmented-reality view.

In some implementations, at 914, the method 900 optionally may include capturing, via a camera of the augmented-reality device, a first image while the current pose cue is aligned with the predetermined pose cue at a first time. Such image capture may be manually triggered or automatically triggered responsive to achieving alignment.

In some implementations the augmented-reality device may be configured to assemble a time-lapse animation of the physical space using the virtual cues. As such, method 900 may be repeated for each frame of a time-lapse animation.

Virtual cues may be presented by any suitable augmented-reality device. FIG. 10 shows aspects of a wearable stereoscopic display system 10 that may be configured to present virtual cues. The display system includes right and left display windows 12R and 12L, right and left over-the-ear loudspeakers 14R and 14L, and a frame 16 configured to rest on a wearer's head. Each of the right and left display windows includes display-projection componentry (vide infra) configured to project computerized display imagery into the wearer's field of view (FOV). In some implementations, the right and left display windows are wholly or partially transparent from the perspective of the wearer, to give the wearer a clear view of his or her surroundings. In some implementations, the right and left display windows are opaque, such that the wearer is completely absorbed in the virtual-reality (VR) imagery provided via the display system, which optionally can be admixed with real imagery captured by a scene-facing camera. In some implementations, the opacity of the right and left display windows is controllable dynamically via a dimming filter. A substantially see-through display window, accordingly, may be switched to full opacity for a fully immersive MR experience.

Display system 10 includes an on-board computer 18 and an on-board communication system 20. In some implementations, the on-board computer is configured to render the computerized display imagery, which is provided to right and left display windows 12. In some implementations, such rendering is controlled, in whole or in part, by data received through the on-board communication system. In some implementations, such data may be transmitted by off-board computer 18'. The off-board computer may be a game console, desktop computer, or server system, for example. In other implementations, the off-board computer may be a laptop or tablet computer, smartphone, hand-held gaming device, etc. Display imagery or data controlling the rendering of display imagery may be communicated in any manner from off-board computer 18' to on-board computer 18. Signal encoding such data may be carried over a wired or wireless communication link between communication systems 20 of the respective computers. In some implementations, some or all of the functionality here ascribed to off-board computer 18 may be enacted instead in on-board computer 18'.

When display system 10 is in operation, computer 18 sends appropriate control signals to right display window 12R that cause the right display window to form a right display image. Likewise, the computer sends appropriate control signals to left display window 12L that cause the left display window to form a left display image. The wearer of the display system views the right and left display images through right and left eyes, respectively. When the right and left display images are composed and presented in an appropriate manner, the wearer experiences the illusion of virtual imagery—i.e., one or more virtual objects at specified positions, and having specified 3D content and other display properties. Such virtual imagery may have any desired complexity; it may, for example, comprise a complete virtual scene having both foreground and background portions.

Display system 10 also includes a pose sensing system or position-sensing componentry 22 usable to determine the position and orientation of the display system in an appropriate frame of reference. In some implementations, the position-sensing componentry returns a six degrees-of-freedom (6DOF) estimate of the three Cartesian coordinates of the display system plus a rotation about each of the three Cartesian axes. To this end, the position-sensing componentry may include any, some, or each of an accelerometer, gyroscope, magnetometer, and global-positioning system (GPS) receiver. The output of the position-sensing componentry may be used to map the position, size, and orientation of virtual display objects (defined globally) onto the right and left display windows 12 of the display system.

Display system 10 also includes a world-facing machine vision system in the form of a color or monochrome flat-imaging camera 21 and a depth-imaging camera 23. The term 'camera' refers herein to any machine-vision component having at least one optical aperture and sensor array configured to image a scene or subject. A depth-imaging camera may be configured to acquire a time-resolved sequence of depth maps of a scene or subject. As used herein, the term 'depth map' refers to an array of pixels registered to corresponding regions ($X_i$, $Y_i$) of an imaged scene, with a depth value $Z_i$ indicating, for each pixel, the depth of the corresponding region. 'Depth' is defined as a coordinate parallel to the optical axis of the camera, which increases with increasing distance from the camera. Operationally, a depth-imaging camera may be configured to acquire 2D image data, from which a depth map is obtained via downstream processing. The term 'depth video' refers herein to a time-resolved sequence of depth maps.

The configuration of a depth-imaging camera may differ from one implementation to the next. In one example, brightness or color data from two, stereoscopically oriented imaging arrays in a depth-imaging camera may be co-registered and used to construct a depth map. More generally, depth coordinates into a scene may be obtained using one or more flat-imaging cameras, with optical-tomography based co-registration of imaged features. Hyperspectral flat imaging may be used with this approach, for improved feature discrimination. In other examples, an illumination source associated with the depth-imaging camera may be configured to project onto the subject a structured illumination pattern comprising numerous discrete features—e.g., lines or dots. An imaging array in the depth-imaging camera may be configured to image the structured illumination reflected back from the subject. Based on the spacings between adjacent features in the various regions of the imaged subject, a depth map of the subject may be constructed. In still other examples, the illumination source may project a pulsed or otherwise modulated infrared (IR) or near IR illumination towards the subject. The sensor elements of the imaging array may be addressed so as to resolve a phase offset from each sensor element relative to the periodic modulation of the illumination source. The phase offset, optionally converted to the depth domain, may be associated with the portion of the image corresponding to the sensor element addressed. In some implementations, a series of IR acquisitions in rapid succession may be used to obtain the phase offset. In other implementations, a pair of imaging arrays in the depth-imaging camera may be configured to detect the pulsed illumination reflected back from the subject. Both arrays may include an electronic shutter synchronized to the pulsed illumination, but the integration times for the arrays may differ, such that a pixel-resolved time-of-flight (ToF) of the pulsed illumination, from the illumination source to the subject and then to the arrays, is discernible based on the relative amounts of light received in corresponding elements of the two arrays.

In some implementations, discrete flat-imaging and depth-imaging cameras may be arranged with parallel optical axes oriented in the same direction. In some implementations, image or video output from the flat-imaging and depth-imaging cameras may be co-registered and combined into a unitary (e.g., RGB+depth) data structure or stream. In examples in which depth-imaging camera is a suitably configured ToF depth-imaging camera, a data stream representing both depth and brightness (e.g., IR+depth) may be available by combining outputs differing in phase.

In some implementations, an object-recognition engine is arranged downstream of the world-facing machine-vision system. Using image-identification algorithms, the object-recognition engine may be configured to compare objects resolved by the machine vision system to a plurality of objects stored in a database or defined heuristically, and to identify a match. For some objects, the object-recognition engine may identify a generic match (this object is a person) and/or a specific match (this object is a particular person associated with a particular computer identity).

Figure 11:
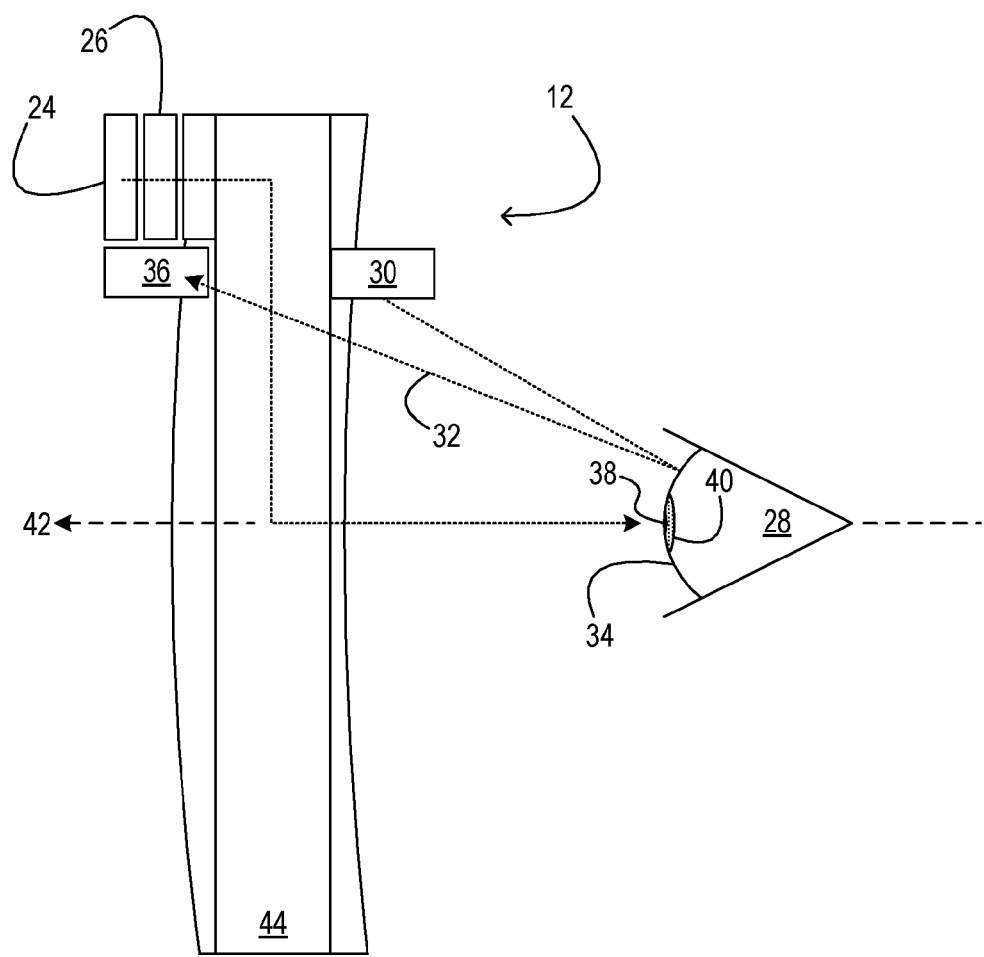
FIG. 11 shows aspects of an example display window of a near-eye display system.

FIG. 11 shows aspects of right or left display window 12 in one, non-limiting implementation. The display window includes a backlight 24 and a liquid-crystal display (LCD) matrix 26. The backlight may include an ensemble of light-emitting diodes (LEDs)—e.g., white LEDs or a distribution of red, green, and blue LEDs. The backlight may be situated to direct its emission through the LCD matrix, which forms a display image based on control signals from on-board computer 18. The LCD matrix may include numerous, individually addressable pixels arranged on a rectangular grid or other geometry. In some implementations, pixels transmitting red light may be juxtaposed in the matrix to pixels transmitting green and blue light, so that the LCD matrix forms a color image. The LCD matrix may be a liquid-crystal-on-silicon (LCOS) matrix in one implementation. In other implementations, a digital micromirror array may be used in lieu of the LCD matrix, or an active LED matrix may be used instead. In still other implementations, scanned-beam technology may be used to form the right and left display images.

Continuing in FIG. 11, display window 12 also includes eye-tracking componentry configured to sense a pupil position of the right or left eye 28 of the wearer of display system 10. In the implementation of FIG. 11, the eye-tracking componentry takes the form of an imaging system that images light from eye lamp 30 reflected off the wearer's eye. The eye lamp may include an IR or near-IR LED configured to illuminate the eye. In one implementation, the eye lamp may provide relatively narrow-angle illumination, to create a specular glint 32 on the cornea 34 of the eye. The imaging system includes at least one camera 36 configured to image light in the emission-wavelength range of the eye lamp. This camera may be arranged and otherwise configured to capture light from the eye lamp, which is reflected from the eye. Image data from the camera is conveyed to associated logic in on-board computer 18. There, the image data may be processed to resolve such features as pupil center 38, pupil outline 40, and/or one or more specular glints 32 from the cornea. The locations of such features in the image data may be used as input parameters in a model—e.g., a polynomial model—that relates feature position to the gaze vector 42 of the eye. The gaze vector can be used to target objects in the wearer's FOV, to actuate a gazed-based UI control, etc.

In most cases, the display image from LCD matrix 26 is not suitable for direct viewing by the wearer of display system 10. In particular, the display image may be offset from the wearer's eye, may have an undesirable vergence, and/or a very small exit pupil. By passing the display image through a horizontal and vertical pupil expander 44, the display image is presented over an area that substantially covers the eye. This enables the wearer to see the display image over a suitable range of horizontal and vertical offsets between the optical system and the eye.

Figure 12:
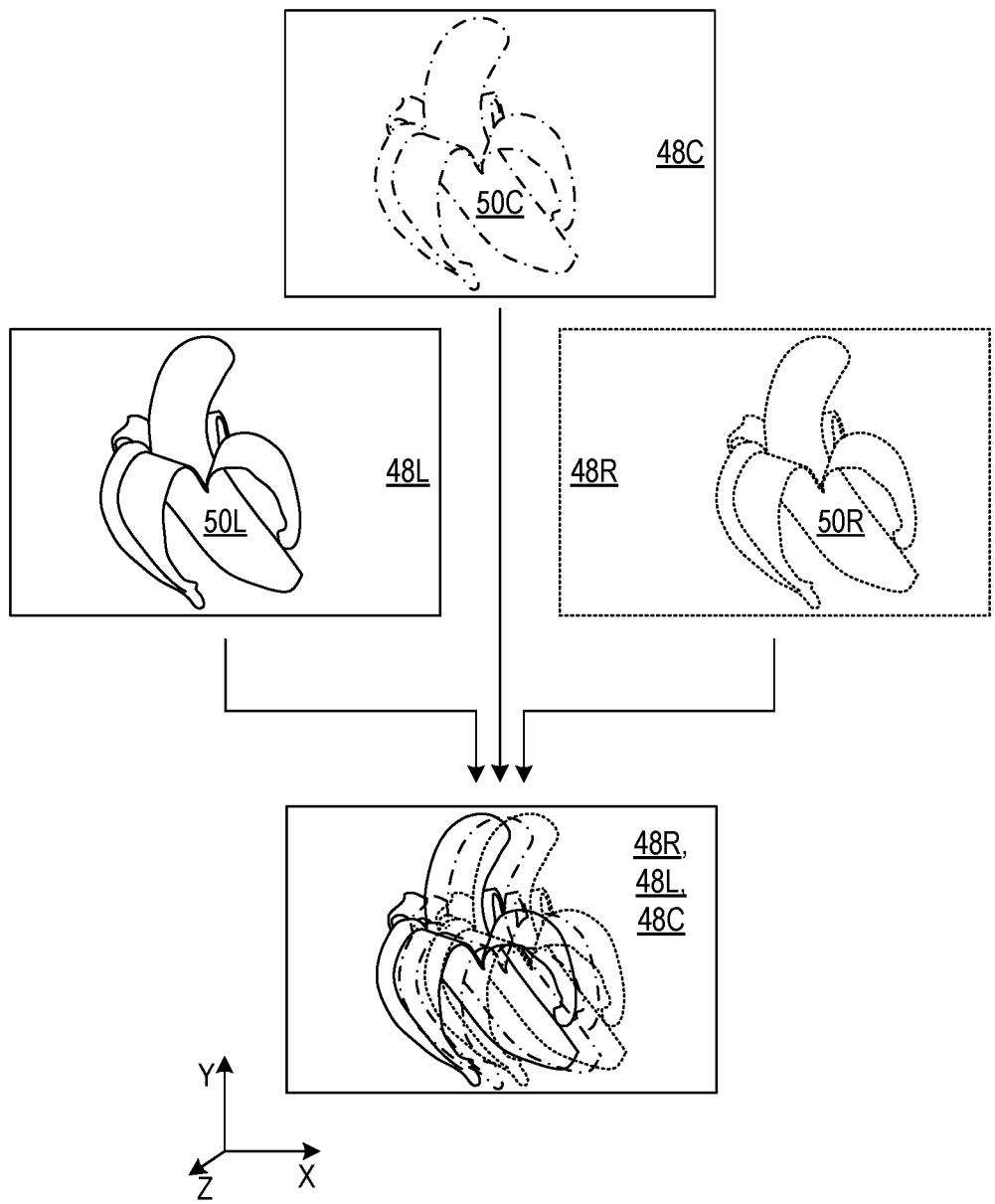
FIGS. 12 and 13 show stereoscopic display of a virtual object.
Figure 13:
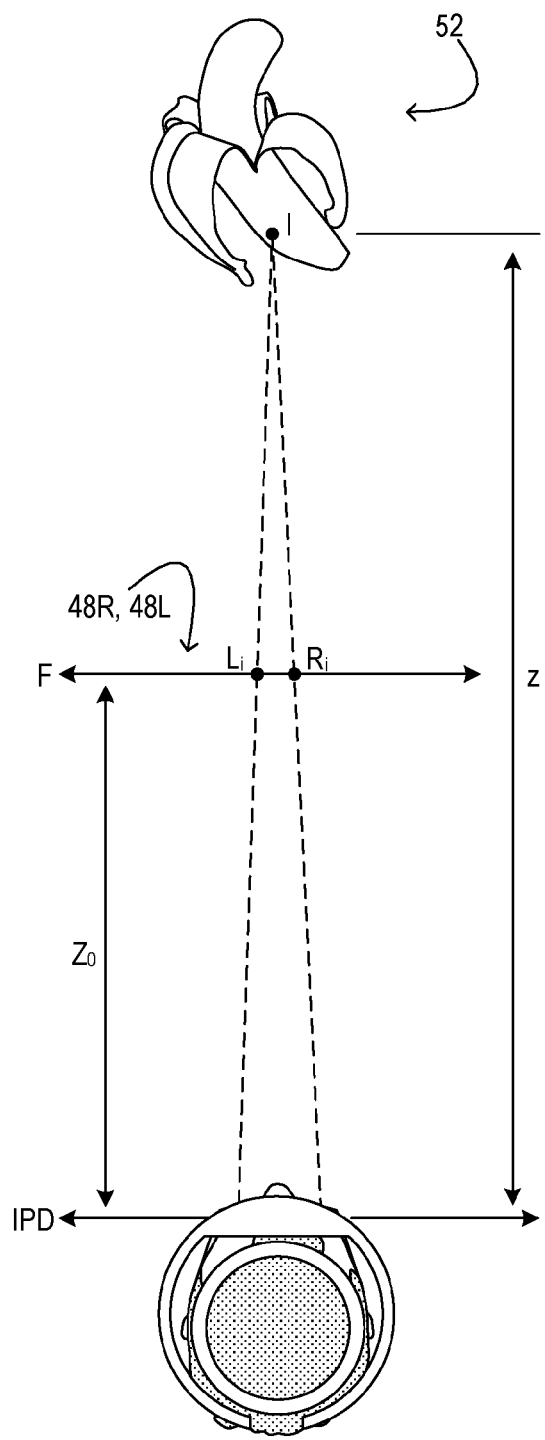

The wearer's perception of distance to virtual display imagery is affected by the positional disparity between the right and left display images. This principle is illustrated by way of example in FIG. 12. FIG. 12 shows right and left image frames 48R and 48L, overlaid upon each other for purposes of illustration. The right and left image frames correspond to the image-forming areas of LCD matrix 26 of the right and left display windows, respectively. As such, the right image frame encloses right display image 50R, and the left image frame encloses left display image 50L. Rendered appropriately, the right and left display images may appear to the wearer as virtual imagery. In the example of FIG. 12, the virtual imagery presents a surface of individually renderable loci viewable to the wearer. With reference to FIG. 13, each locus i of the viewable surface has a depth coordinate Zi associated with each pixel (Xi, Yi) of the right and left display images. The desired depth coordinate may be simulated in the following manner.

At the outset, a distance Z0 to a focal plane F of display system 10 is chosen. The left and right optical systems are then configured to present their respective display images at a vergence appropriate for the chosen distance. In one implementation, Z0 may be set to 'infinity', so that each optical system presents a display image in the form of collimated light rays. In another implementation, Z0 may be set to two meters, requiring each optical system to present the display image in the form of diverging light. In some implementations, Z0 may be chosen at design time and remain unchanged for all virtual imagery presented by the display system. In other implementations, the optical systems may be configured with electronically adjustable optical power, to allow Z0 to vary dynamically according to the range of distances over which the virtual imagery is to be presented.

Once the distance Z0 to the focal plane has been established, the depth coordinate Z for every locus i on the viewable surface may be set. This is done by adjusting the positional disparity of the two pixels corresponding to locus i in the right and left display images, relative to their respective image frames. In FIG. 13, the pixel corresponding to locus i in the right image frame is denoted Ri, and the corresponding pixel of the left image frame is denoted Li. In FIG. 13, the positional disparity is positive—i.e., R is to the right of Li in the overlaid image frames. This causes locus i to appear behind focal plane F. If the positional disparity were negative, the locus would appear in front of the focal plane. Finally, if the right and left display images were superposed (no disparity, Ri and Li coincident) then the locus would appear to lie directly on the focal plane. Without tying this disclosure to any particular theory, the positional disparity D may be related to Z, Z0, and to the interpupilary distance (IPD) of the wearer by $$D = IDP \times \left(1 - \frac{Z_0}{Z}\right).$$

In the approach described above, the positional disparity sought to be introduced between corresponding pixels of the right and left display images is 'horizontal disparity'—viz., disparity parallel to the interpupilary axis of the wearer of display system 10. Horizontal disparity mimics the effect of real-object depth on the human visual system, where images of a real object received in the right and left eyes are naturally offset along the interpupilary axis.

Virtual imagery of any desired complexity may be rendered. In one implementation, logic in on-board computer 18 or off-board computer 18' maintains a model of the Cartesian space in front of the wearer in a frame of reference fixed to display system 10. The wearer's pupil positions are mapped onto this space, as are the image frames 48R and 48L, which are positioned at the predetermined depth Z0. Then, virtual imagery 52 is constructed, with each locus i of a viewable surface of the imagery having coordinates Xi, Yi, and Zi, in the common frame of reference. For each locus of the viewable surface, two line segments are constructed-a first line segment to the pupil position of the wearer's right eye and a second line segment to the pupil position of the wearer's left eye. The pixel Ri of the right display image, which corresponds to locus i, is taken to be the intersection of the first line segment in right image frame 48R. Likewise, the pixel Li of the left display image is taken to be the intersection of the second line segment in left image frame 48L. This procedure automatically provides the appropriate amount of shifting and scaling to correctly render the viewable surface, placing every locus i at the required distance from the wearer.

Furthermore, FIG. 12 shows a capture image frame 48C corresponding to a perspective of a world-facing camera used to capture an augmented-reality image for later playback (e.g., as part of an augmented-reality GIF). The capture image frame 48C encloses a capture display image 50C. The approach of FIG. 13 and the related description may be used to generate capture image 48C so that virtual imagery will appear to have the correct position relative to real-world imagery in captured augmented-reality images. In essence, the camera lens can be thought of as a third eye, and a perspective of the virtual world may be rendered in the same manner used for the left and right eyes.

No aspect of the foregoing description or drawings should be interpreted in a limiting sense, for numerous variants lie within the spirit and scope of this disclosure. For instance, although display system 10 of FIG. 10 is a near-eye display system in which the right display image appears behind a right display window, and the left display image appears behind a left display window, the right and left display images may also be formed on the same screen. In a stereo display system for a laptop computer, for example, or home-theatre system, the right display image may be formed on a display screen using light of one polarization state, and the left display image may be formed on the same display screen using light of different polarization state. Orthogonally aligned polarization filters in the user's eyewear may be used to ensure that the each display image is received in the appropriate eye.

Any suitable augmented-reality device may be used to present virtual cues to aid alignment of a current pose of the augmented-reality device with a predetermined pose. The above-described example devices and their respective sensor, logic, and other hardware components are non-limiting. While the above description uses the term "augmented reality" to describe virtual objects admixed with real-world objects, the above description is equally applicable to virtual reality (i.e., only virtual objects without real-world objects) and mixed reality (i.e., a subset of augmented reality in which virtual objects have world-locked positions relative to real objects). As such, the term "augmented reality" may be interchanged with "virtual reality" and "mixed reality" in the above description.

In some implementations, an augmented-reality device may include a combination of physical cues and virtual cues to aid alignment of the current pose of the augmented-reality device with a predetermined pose. For example, a current pose cue may be a permanent feature of an optical system of the augmented-reality device, such as a cross hairs or a targeting reticle. Further, the predetermined pose cue may be a virtual indicator that is visually presented relative to the permanent current pose cue.

Communication system 20 may be configured to communicatively couple a computer with one or more other machines. The communication system may include wired and/or wireless communication devices compatible with one or more different communication protocols. As non-limiting examples, a communication system may be configured for communication via a wireless telephone network, or a wired or wireless local- or wide-area network. In some implementations, a communication system may allow a computer to send and/or receive messages to and/or from other devices via a network such as the Internet.

As evident from the foregoing description, the methods and processes described herein may be tied to a computer system of one or more computers (i.e., computers). Such methods and processes may be implemented as a computer-application program or service, an application-programming interface (API), a library, and/or other computer-program product.

Shown in FIG. 10 in simplified form is a non-limiting example of a computer system used to support the methods and processes described herein. Each computer 18 in the computer system includes a logic machine 76 and an instruction-storage machine 78. The computer system also includes a display in the form of display windows 12R and 12L, a communication system 20, and various components not shown in FIG. 10. Computing system 18 may be representative of any suitable computing device, such as the mobile computing device 100, display device 10, or another computing device.

Each logic machine 76 includes one or more physical devices configured to execute instructions. For example, a logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Each logic machine 76 may include one or more processors configured to execute software instructions. Additionally or alternatively, a logic machine may include one or more hardware or firmware logic machines configured to execute hardware or firmware instructions. Processors of a logic machine may be single-core or multi-core, and the instructions executed thereon may be configured for sequential, parallel, and/or distributed processing. Individual components of a logic machine optionally may be distributed among two or more separate devices, which may be remotely located and/or configured for coordinated processing. Aspects of a logic machine may be virtualized and executed by remotely accessible, networked computing devices configured in a cloud-computing configuration.

Each instruction-storage machine 78 includes one or more physical devices configured to hold instructions executable by an associated logic machine 76 to implement the methods and processes described herein. When such methods and processes are implemented, the state of the instruction-storage machine may be transformed—e.g., to hold different data. An instruction-storage machine may include removable and/or built-in devices; it may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. An instruction-storage machine may include volatile, nonvolatile, dynamic, static, read/write, read-only, random-access, sequential-access, location-addressable, file-addressable, and/or content-addressable devices.

It will be appreciated that each instruction-storage machine 78 includes one or more physical devices. However, aspects of the instructions described herein alternatively may be propagated by a communication medium (e.g., an electromagnetic signal, an optical signal, etc.) that is not held by a physical device for a finite duration.

Aspects of the logic machine(s) and instruction-storage machine(s) may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms 'program' and 'engine' may be used to describe an aspect of a computer system implemented to perform a particular function. In some cases, a program or engine may be instantiated via a logic machine executing instructions held by an instruction-storage machine. It will be understood that different programs and/or engines may be instantiated from the same application, service, code block, object, library, routine, API, function, etc. Likewise, the same program and/or engine may be instantiated by different applications, services, code blocks, objects, routines, APIs, functions, etc. The terms 'program' and 'engine' may encompass individual or groups of executable files, data files, libraries, drivers, scripts, database records, etc.

It will be appreciated that a 'service', as used herein, is an application program executable across multiple user sessions. A service may be available to one or more system components, programs, and/or other services. In some implementations, a service may run on one or more server-computing devices.

Communication system 20 may be configured to communicatively couple a computer with one or more other machines. The communication system may include wired and/or wireless communication devices compatible with one or more different communication protocols. As non-limiting examples, a communication system may be configured for communication via a wireless telephone network, or a wired or wireless local- or wide-area network. In some implementations, a communication system may allow a computer to send and/or receive messages to and/or from other devices via a network such as the Internet.

In an example, a method comprises determining a current pose of an augmented reality device in a physical space, and visually presenting, via a display of the augmented reality device, an augmented-reality view of the physical space including a predetermined pose cue indicating a predetermined pose in the physical space and a current pose cue indicating the current pose in the physical space. In this example and/or other examples, the predetermined pose cue may have a world-locked position that is fixed relative to the physical space, and the current pose cue may have a device-locked position that changes with the current pose of the augmented-reality device. In this example and/or other examples, the predetermined pose may be determined, via a pose sensing system of the augmented-reality device, during capture of a previously-captured image of the physical space. In this example and/or other examples, the method may further comprise visually presenting, via the display, a visual alignment cue indicating that the current pose cue is at least partially aligned with the predetermined pose cue. In this example and/or other examples, the method may further comprise audibly presenting, via an audio speaker of the augmented-reality device, an audio alignment cue indicating that the current pose cue is at least partially aligned with the predetermined pose cue. In this example and/or other examples, the method may further comprise capturing, via a camera of the augmented-reality device, a first image at a first time while the current pose cue is aligned with the predetermined pose cue, and capturing, via the camera, a second image at a second time subsequent to the first time while the current pose cue is aligned with the predetermined pose cue. In this example and/or other examples, the predetermined pose cue may be a first predetermined pose cue, and the method may further comprise capturing, via a camera of the augmented-reality device, a first image while the current pose cue is aligned with the first predetermined pose cue, visually presenting, via the display, a second predetermined pose cue different than the first predetermined pose cue, and capturing, via the camera, a second image while the current pose cue is aligned with the second predetermined pose cue.

In an example, an augmented-reality device, comprises a camera configured to image a physical space, a pose sensing system configured to determine a current pose of the augmented-reality device in the physical space, a display, a logic machine, and a storage machine holding instructions executable by the logic machine to receive a predetermined pose in the physical space, and visually present, via the display, an augmented-reality view of the physical space including a predetermined pose cue indicating the predetermined pose in the physical space and a current pose cue indicating the current pose in the physical space. In this example and/or other examples, the predetermined pose cue may have a world-locked position that is fixed relative to the physical space, and the current pose cue may have a device-locked position that changes with the current pose of the augmented-reality device. In this example and/or other examples, the storage machine may further hold instructions executable by the logic machine to visually present, via the display, a visual alignment cue indicating that the current pose cue is at least partially aligned with the predetermined pose cue. In this example and/or other examples, the predetermined pose cue, the current pose cue, and the visual alignment cue may be visually different from each other. In this example and/or other examples, the augmented-reality device may further comprise an audio speaker, and the storage machine may further hold instructions executable by the logic machine to audibly present, via the audio speaker, an audio alignment cue indicating that the current pose cue is at least partially aligned with the predetermined pose cue. In this example and/or other examples, the predetermined pose may be determined, via the pose sensing system, during capture of a previously-captured image of the physical space. In this example and/or other examples, the predetermined pose cue may include the previously-captured image with a world-locked position at the predetermined pose. In this example and/or other examples, the predetermined pose cue may at least partially indicate a field of view from the predetermined pose, and the current pose cue may at least partially indicate a field of view of the current pose. In this example and/or other examples, the predetermined pose cue may include a first set of coplanar markers, and the current pose cue may include a second set of coplanar markers. In this example and/or other examples, the storage machine may further hold instructions executable by the logic machine to capture, via the camera, a first image of the physical space at a first time while the current pose cue is aligned with the predetermined pose cue in the augmented-reality view, and capture, via the camera, a second image of the physical space at a second time subsequent to the first time while the current pose cue is aligned with the predetermined pose cue in the augmented-reality view. In this example and/or other examples, the predetermined pose cue may be a first predetermined pose cue, and the storage machine may further hold instructions executable by the logic machine to capture, via the camera, a first image of the physical space while the current pose cue is aligned with the first predetermined pose cue, visually present, via the display, a second predetermined pose cue different than the first predetermined pose cue, and capture, via the camera, a second image while the current pose cue is aligned with the second predetermined pose cue.

In an example, a method comprises receiving a previous pose assumed by an augmented-reality device during capture of a previously-captured image of a physical space by a camera of the augmented-reality device, determining a current pose of the augmented reality device in the physical space, and visually presenting, via a display of the augmented reality device, an augmented-reality view of the physical space including a predetermined pose cue and a current pose cue, wherein the predetermined pose cue indicates the predetermined pose in the physical space and has a world-locked position that is fixed relative to the physical space, and wherein the current pose cue indicates the current pose in the physical space and has a device-locked position that changes with the current pose of the augmented-reality device. In this example and/or other examples, the method may further comprise visually presenting, via the display, a visual alignment cue indicating that the current pose cue is at least partially aligned with the predetermined pose cue.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method comprising:
   determining a current pose of an augmented-reality device in a physical space;
   visually presenting, via a display of the augmented-reality device, an augmented-reality view of the physical space including a predetermined pose cue indicating a predetermined pose in the physical space and a current pose cue indicating the current pose in the physical space, wherein the current pose cue includes a virtual object overlaid on a current field of view of the display and has a device-locked position such that the current pose cue appears to occupy a same portion of the display and appears to be a same distance in front of the augmented-reality device even as the current pose of the augmented-reality device changes, and wherein the current pose cue aligns with the predetermined pose cue when the current pose aligns with the predetermined pose; and visually replacing, via the display, the predetermined pose cue and the current pose cue with a visual alignment cue in response to the current pose being aligned with the predetermined pose in the physical space, the visual alignment cue indicating that the current pose of the augmented-reality device in the physical space is aligned with the predetermined pose in the physical space.

2. The method of claim 1, wherein the predetermined pose cue has a world-locked position that is fixed relative to the physical space, and wherein the predetermined pose cue and the current pose cue have a same shape and size when the current pose cue is aligned with the predetermined pose cue.

3. The method of claim 1, wherein the predetermined pose is determined, via a pose sensing system of the augmented-reality device, during capture of a previously-captured image of the physical space.

4. The method of claim 1, further comprising:
audibly presenting, via an audio speaker of the augmented-reality device, an audio alignment cue indicating that the current pose cue is at least partially aligned with the predetermined pose cue.

5. The method of claim 1, further comprising:
capturing, via a camera of the augmented-reality device, a first image at a first time while the current pose cue is aligned with the predetermined pose cue; and
capturing, via the camera, a second image at a second time subsequent to the first time while the current pose cue is aligned with the predetermined pose cue.

6. The method of claim 1, wherein the predetermined pose cue is a first predetermined pose cue, and wherein the method further comprises:
capturing, via a camera of the augmented-reality device, a first image while the current pose cue is aligned with the first predetermined pose cue;
visually presenting, via the display, a second predetermined pose cue different than the first predetermined pose cue; and
capturing, via the camera, a second image while the current pose cue is aligned with the second predetermined pose cue.

7. The method of claim 1, wherein the visual alignment cue has a different visual appearance than the predetermined pose cue and the current pose cue.

8. An augmented-reality device, comprising:
a camera configured to image a physical space;
a pose sensing system configured to determine a current pose of the augmented-reality device in the physical space;
a display;
a logic machine; and
a storage machine holding instructions executable by the logic machine to:
receive a predetermined pose in the physical space;
visually present, via the display, an augmented-reality view of the physical space including a predetermined pose cue indicating the predetermined pose in the physical space and a current pose cue indicating the current pose in the physical space, wherein the current pose cue includes a virtual object overlaid on a current field of view of the display and has a device-locked position such that the current pose cue appears to occupy a same portion of the display and appears to be a same distance in front of the augmented-reality device even as the current pose of the augmented-reality device changes, and wherein the current pose cue aligns with the predetermined pose cue when the current pose aligns with the predetermined pose; and
visually replace, via the display, the predetermined pose cue and the current pose cue with a visual alignment cue in response to the current pose being aligned with the predetermined pose in the physical space, the visual alignment cue indicating that the current pose of the augmented-reality device in the physical space is aligned with the predetermined pose in the physical space.

9. The augmented-reality device of claim 8, wherein the predetermined pose cue has a world-locked position that is fixed relative to the physical space, and wherein the current pose cue has the device-locked position that changes with the current pose of the augmented-reality device.

10. The augmented-reality device of claim 8, wherein the predetermined pose cue, the current pose cue, and the visual alignment cue are visually different from each other.

11. The augmented-reality device of claim 8, further comprising:
an audio speaker; and
wherein the storage machine further holds instructions executable by the logic machine to:
audibly present, via the audio speaker, an audio alignment cue indicating that the current pose cue is at least partially aligned with the predetermined pose cue.

12. The augmented-reality device of claim 8, wherein the predetermined pose is determined, via the pose sensing system, during capture of a previously-captured image of the physical space.

13. The augmented-reality device of claim 12, wherein the predetermined pose cue includes the previously-captured image with a world-locked position at the predetermined pose.

14. The augmented-reality device of claim 8, wherein the predetermined pose cue at least partially indicates a field of view from the predetermined pose, and wherein the current pose cue at least partially indicates a field of view of the current pose.

15. The augmented-reality device of claim 8, wherein the predetermined pose cue includes a first set of coplanar markers, and wherein the current pose cue includes a second set of coplanar markers.

16. The augmented-reality device of claim 8, wherein the storage machine further holds instructions executable by the logic machine to:
capture, via the camera, a first image of the physical space at a first time while the current pose cue is aligned with the predetermined pose cue in the augmented-reality view; and
capture, via the camera, a second image of the physical space at a second time subsequent to the first time while the current pose cue is aligned with the predetermined pose cue in the augmented-reality view.

17. The augmented-reality device of claim 8, wherein the predetermined pose cue is a first predetermined pose cue, and wherein the storage machine further holds instructions executable by the logic machine to:
capture, via the camera, a first image of the physical space while the current pose cue is aligned with the first predetermined pose cue;

visually present, via the display, a second predetermined pose cue different than the first predetermined pose cue; and capture, via the camera, a second image while the current pose cue is aligned with the second predetermined pose cue.

18. The augmented-reality device of claim 8, wherein the visual alignment cue has a different visual appearance than the predetermined pose cue and the current pose cue.

19. A method comprising:

receiving a previous pose assumed by an augmented-reality device during capture of a previously-captured image of a physical space by a camera of the augmented-reality device;

determining a current pose of the augmented-reality device in the physical space;

visually presenting, via a display of the augmented-reality device, an augmented-reality view of the physical space including a predetermined pose cue and a current pose cue, wherein the predetermined pose cue indicates the predetermined pose in the physical space and has a world-locked position that is fixed relative to the physical space, and wherein the current pose cue indicates the current pose in the physical space and includes a virtual object overlaid on a current field of view of the display that has a device-locked position that changes with the current pose of the augmented-reality device such that the current pose cue appears to occupy a same portion of the display and appears to be a same distance in front of the augmented-reality device even as the current pose of the augmented-reality device changes, and wherein the current pose cue aligns with the predetermined pose cue when the current pose aligns with the predetermined pose; and visually replacing, via the display, the predetermined pose cue and the current pose cue with a visual alignment cue in response to the current pose being aligned with the predetermined pose in the physical space, the visual alignment cue indicating that the current pose of the augmented-reality device in the physical space is aligned with the predetermined pose in the physical space.

20. The method of claim 19, wherein the visual alignment cue has a different visual appearance than the predetermined pose cue and the current pose cue.

* * * * *